United States Patent
Peinemann et al.

(10) Patent No.: US 6,755,893 B2
(45) Date of Patent: Jun. 29, 2004

(54) METHOD FOR HIGH-PRESSURE GAS SEPARATION

(75) Inventors: Klaus-Victor Peinemann, Geesthacht (DE); Michael Schossig, Schwarzenbeck (DE); Lorenza Sartorelli, Hamburg (DE); Walter Kulcke, Hamburg (DE); Gerd Brunner, Hamburg (DE)

(73) Assignee: Technische Universität Hamburg-Harburg, Hamburg (DE)

( * ) Notice: Subject to any disclaimer, the term of this patent is extended or adjusted under 35 U.S.C. 154(b) by 0 days.

(21) Appl. No.: 10/330,044

(22) Filed: Dec. 26, 2002

(65) Prior Publication Data

US 2003/0183079 A1 Oct. 2, 2003

Related U.S. Application Data

(63) Continuation-in-part of application No. PCT/DE01/02333, filed on Jun. 27, 2001.

(30) Foreign Application Priority Data

Jun. 29, 2000 (DE) .......................................... 100 30 643

(51) Int. Cl.$^7$ ........................... B01D 53/22; B01D 69/12
(52) U.S. Cl. .................................. 95/51; 96/13; 96/14
(58) Field of Search ............................. 95/45, 51; 96/4, 96/13, 14

(56) References Cited

U.S. PATENT DOCUMENTS

| | | | | |
|---|---|---|---|---|
| 4,181,675 A | * | 1/1980 | Makin et al. | 518/705 |
| 4,230,463 A | * | 10/1980 | Henis et al. | 95/47 |
| 4,654,055 A | * | 3/1987 | Malon et al. | 96/13 |
| 5,051,113 A | * | 9/1991 | Nemser | 95/54 |
| 5,051,114 A | * | 9/1991 | Nemser et al. | 95/47 |
| 5,104,425 A | * | 4/1992 | Rao et al. | 95/47 |
| 5,147,417 A | * | 9/1992 | Nemser | 95/54 |
| 5,288,304 A | * | 2/1994 | Koros et al. | 95/45 |
| 6,361,582 B1 | * | 3/2002 | Pinnau et al. | 95/45 |
| 6,361,583 B1 | * | 3/2002 | Pinnau et al. | 95/45 |
| 6,406,517 B1 | * | 6/2002 | Avery et al. | 95/45 |
| 6,506,304 B2 | * | 1/2003 | Tan et al. | 210/644 |
| 6,540,813 B2 | * | 4/2003 | Nelson et al. | 95/53 |

* cited by examiner

Primary Examiner—Robert H. Spitzer
(74) Attorney, Agent, or Firm—Klaus J. Bach

(57) ABSTRACT

In a method for the separation of supercritical gas from substances dissolved in the gas with a membrane through which the gas passes while the substances dissolved in the gas is retained, a pore-free membrane of a polymer perfluoro-2,2-diemthyl-1,3-dioxole is used as a membrane in the separation process.

12 Claims, 3 Drawing Sheets

$$\alpha = \frac{y_{LVC}/(1-y_{LVC})}{x_{LVC}/(1-x_{LVC})}$$

METHOD FOR HIGH-PRESSURE GAS SEPARATION

This is a Continuation-in-Part Application of international patent application PCT/DE01/02333 filed on Jun. 27, 2001 and claiming the priority of German patent application 100 30 643.8 filed Jun. 29, 2000.

BACKGROUND OF THE INVENTION

The invention relates to a method for separating supercritical gas from substances dissolved in the gas.

The extraction of substances using supercritical carbon dioxide (called below $scCO_2$) is a well-known method, which has important advantages particularly in that it does not require environmentally unacceptable organic solvents. The disadvantage however is high energy costs caused by the compression of the carbon dioxide after the separation of the extracted substances from the supercritical carbon dioxide. With the utilization of the dissolving capability of the $scCO_2$ for the separation of substances, the substances dissolved in the supercritical gas are precipitated generally by a reduction of the pressure from the process pressure to almost critical pressure. The amount of supercritical gas required for the extraction is relatively high. Although such gas has a higher dissolving power than normal gases, the concentration of the dissolved substances is relatively small since many of the substances of interest have a low volatility.

In technical processes, the $scCO_2$ must be kept in a closed flow circuit. The necessary compression procedures require a high energy input. As a result, the process of substance separation with supercritical gases is uneconomical when compared with conventional methods including distillation, vacuum-distillation, short-path distillation and molecular distillation.

It has often been tried therefore to separate the substances dissolved in the supercritical carbon dioxide by suitable procedures, without essential pressure reduction from the supercritical gas pressure. There are several suitable processes. With adsorption, the substances dissolved in the supercritical gas are adsorbed by an adsorption material such as activated carbon or silicon gel. Then, however, the adsorbed substances must be separated from the adsorption material which again may be quite complicated. With the removal of caffeine from green coffee beans by adsorption, an activated carbon for example, the difficulties were so great that the caffeine could not be recovered. This process has therefore been changed and absorption has been used in order to be able to recover the valuable caffeine without pressure reduction.

In the decaffeination process, the caffeine dissolved in the supercritical carbon dioxide is washed out of the supercritical carbon dioxide by water. In this case, such a procedure is advantageous because the caffeine is soluble in water. From the aqueous solution, the caffeine can then be recovered by crystallization.

However, most of the substances of interest for separation with supercritical gases are not soluble in water. Therefore, the process of absorbing in water is not an option, since it would have to be followed by the conventional additional separation step of distillation, which is what the extraction by supercritical gas is to avoid.

A separation-by way of membranes is therefore highly attractive. Substances dissolved (extracts) and supercritical gas (solvent) can be separated from each other without an essential reduction of the supercritical gas pressure.

It is therefore the object of the invention to provide a process for the separation of substances dissolved in supercritical gas without the need for a substantial reduction in the supercritical gas pressure.

SUMMARY OF THE INVENTION

In a method for the separation of supercritical gas from substances dissolved in the gas with a membrane through which the gas passes while the substances dissolved in the gas are retained, a pore-free membrane of a polymer perfluoro-2,2-dimethyl-1,3-dioxol is used as a membrane in the separation process.

Such a process will be described below on the basis of the accompanying drawings.

BRIEF DESCRIPTION OF THE INVENTION

Figure 1:
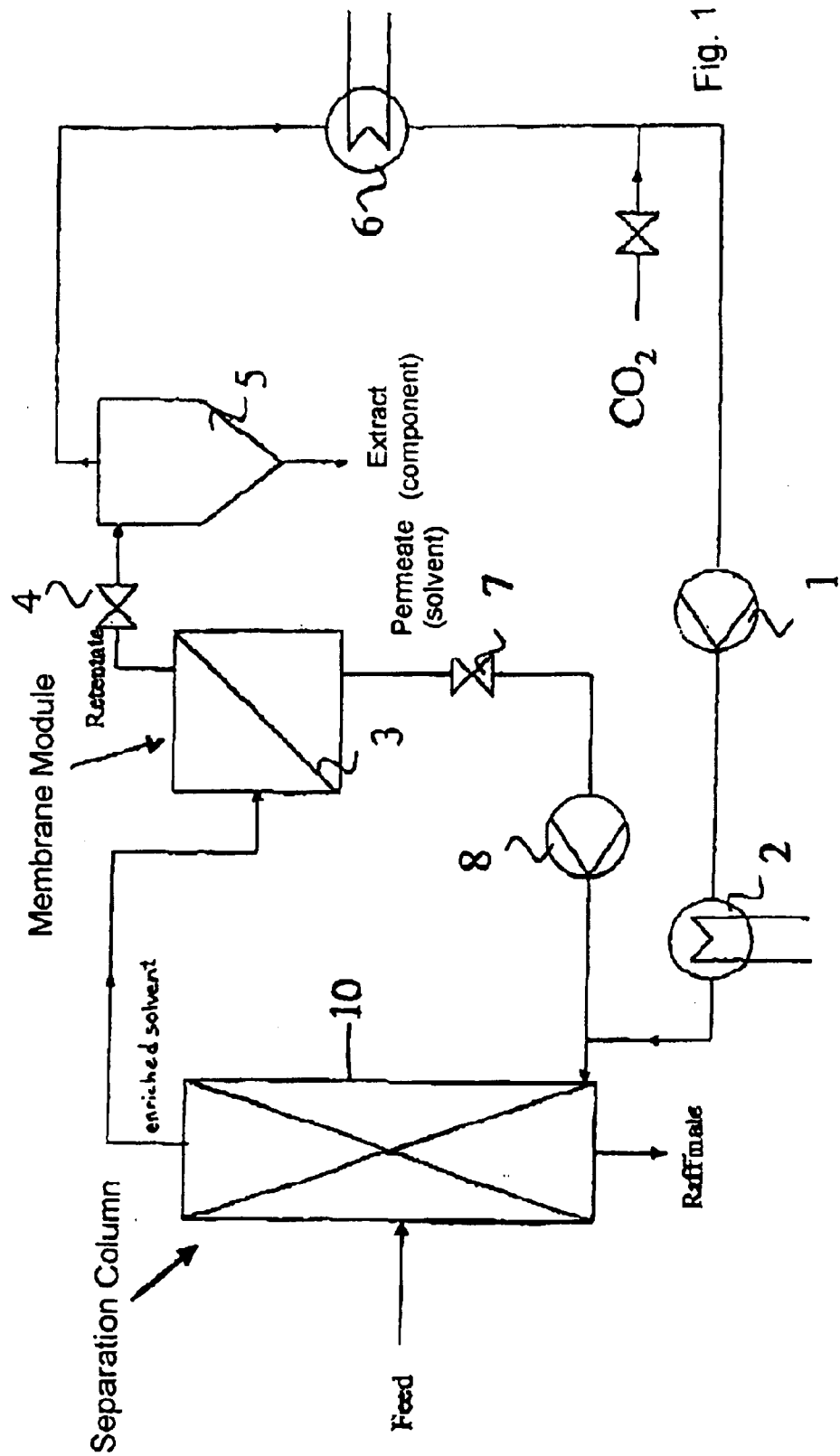
FIG. 1 shows schematically the process according to the invention.

FIG. 1 shows the method utilized for the separation of the desired substances from a supercritical gas solution: Fresh $CO_2$ is compressed by a compressor 1 and subsequently cooled in a cooler 2 and is conducted into the sump of a separating column 10. A feed to be separated is added to the column about at the middle thereof. The feed including the component (substance) to be separated and the solvent move through the column in a counter current relationship while the solvent is enriched with the component which may be, for example, tocopherolacetate. The enriched solvent leaves the column at the top and is conducted to a membrane module 3. The membrane in the module 3 selectively permits the passage of the solvent with little pressure loss, but retains the substances dissolved in the solvent. The enriched retentate is then conducted through a throttle 4, where the pressure is reduced, to a separator 5, in which the solvent is separated from the extract. Subsequently, the cleaned $CO_2$ is heated in a heater 6 and is returned to the circuit. The solvent which has passed through the membrane module 3 contains only a small amount of the dissolved substances and is returned to the separating column by way of a pressure control valve 7 which maintains the transmembrane pressure difference which should not be more than 2 MPa and a compressor which compensates for the relatively small pressure losses in the circuit.

In the past, various attempts have been made to separate mixtures of supercritical gas and components dissolved therein by means of membranes. To this end, anorganic membranes, some with a supporting organic separation layer or pure organic membranes, have been used. All these attempts however have not resulted in suitable results. The separation difficulty resides, on one hand, in the fact that the membrane must be free of pores, that is, that a transport through the membrane can occur only by diffusion. On the other hand, supercritical gases dissolve well in organic polymers. By this dissolution, the membranes are modified so that the components dissolved in the supercritical gas are then easily dissolved in the membrane. This results in an ineffective separation. It has even been found that the dissolved components permeate faster than the supercritical gas which effect is the opposite of the desired effect.

It has now been found by the inventors that, surprisingly, with a particular membrane coating using amorphous Teflon, an excellent separation of the supercritical gases and the components dissolved therein can be achieved under processing condition of up to 350 bar at temperatures of 40 to 100° C. The permeability of the membranes in this process is still sufficiently high so that relatively small membrane modules are sufficient for the separation of dissolved components and for the regeneration of the supercritical gas remaining in the circuit.

This is the decisive event in the development of a separation process that makes the use of supercritical gases economically competitive. The special contribution of the invention is the provision of a separation-active membrane layer, which consists of a perfluoraced plastic material. This is a polymer comprising perfluor-2,2-dimethyl-1,3-dioxol or a copolymer or homopolymer comprising perfluoro-2, 2-dimethyl-1, 3-dioxol and tetrafluoroethylene. The amorphous Teflon is commercially available from the company Dupont under the trade name Teflon AF 1600 and Teflon AF 2400. Membranes of Teflon AF are known (US 5 051 114 and US 5 247 417). It is however novel to use these membranes for the separation of components from supercritical gases, that is, to provide a supercritical gas separation apparatus with Teflon AF membranes. Teflon AF is a very inert polymer, which is soluble in only a few fluorinated solvents. All other organic solvents and supercritical gases have only a very low interaction with the polymer, on which the good separation effect of the Teflon AF in connection with supercritical gases is based.

This is demonstrated by the following example:

EXAMPLE

Figure 2:
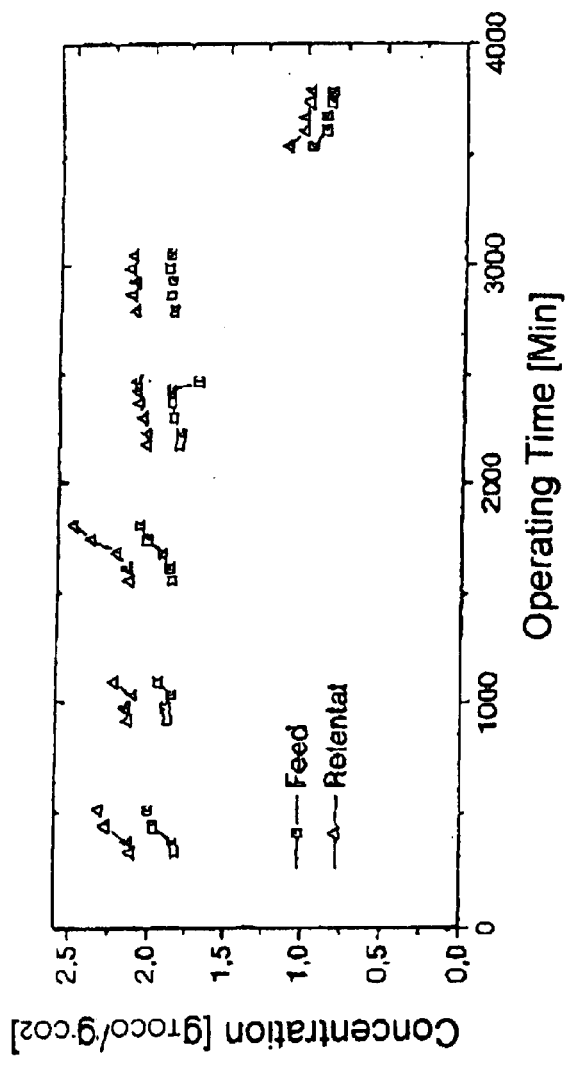
FIGS. 2, 3, and 4 show test results of a number of separating experiments.
Figure 3:
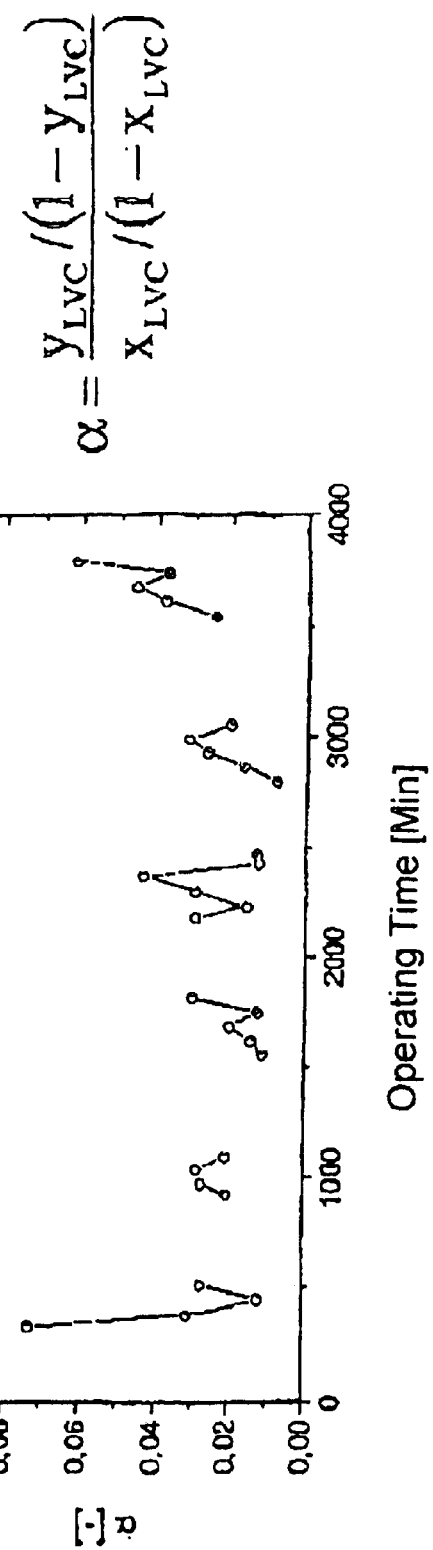
Figure 4:
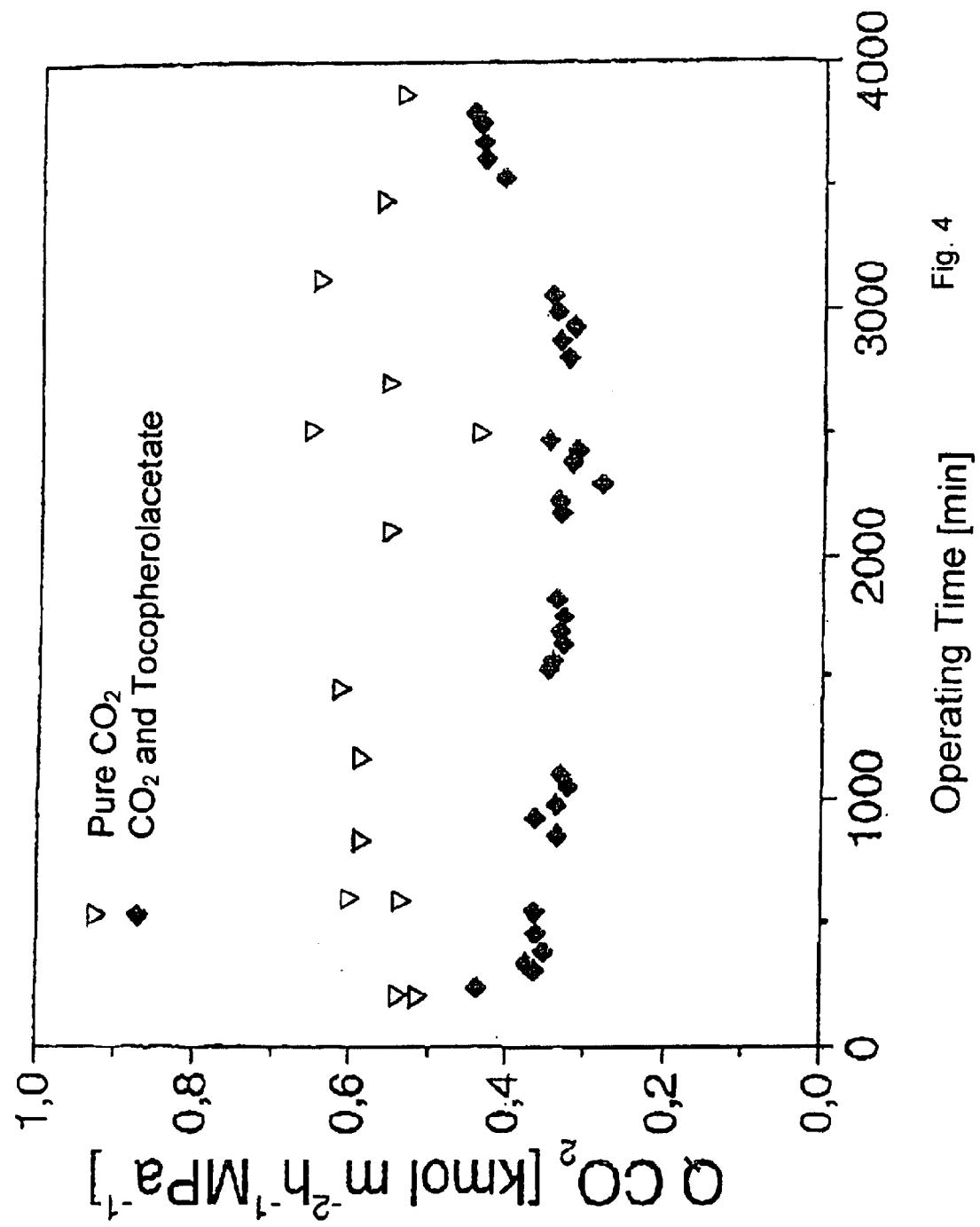

FIGS. 2, 3 and 4 show the results of a series of separation tests for which a composite membrane of microporous polyether imide and pore-free Teflon AF 2400 was used. FIG. 2 shows the tocopherolacetate concentration in the feed and in the retentate of the membrane module over time and FIG. 3 shows the separation factors in connection with these measurements.

The separation factor a is defined as follows:

$$\alpha = \frac{Y_{LVC}/(1 - Y_{LVC})}{X_{LVC}/(1 - X_{LVC})}$$

FIGS. 2 and 3 show the results measured during tests performed at six subsequent days. The operating time corresponds to the time during which the test apparatus was operated under operating conditions. During the operating pauses, the fluid density was the same as during the operating periods, but the apparatus was at room temperature.

As can be seen from the low separation factors, the membrane remains stable over the whole operating period and does not lose its selectivity. Also, with half the feed concentration (at about 3500 min) the separation factor is essentially unchanged.

A copolymer used as a membrane for the high pressure separation of supercritical gas from components dissolved therein may for example contain 65–99 mol% perfluoro-2, 2-dimethyl-1,3-dioxol. It may have a separation layer thickness of 0.2–20 $\mu$m. The separation layer may be disposed on a carrier membrane of porous polyvinylidene fluoride. The carrier membrane may also consist of porous polyether sulfone, of porous polyacryl or of a porous organic ceramic material.

FIG. 4 shows the $CO_2$ permeability through the membrane. For pure $CO_2$ in the feed (open triangle) the permeability is about 0.6 $Kmol/m^2nPa$.

At times in which the feed consists of a mixture of $CO_2$ and tocopherolacetate, the $CO_2$ permeabilities are lower (about 0.35 $Kmol.m^2nMPa$).

A lowering of the TOCD concentration in the feed (about at 3500 min) results in a higher $CO_2$-permeability.

What is claimed is:

1. A method for the high pressure separation of supercritical gas from a component dissolved therein, said method comprising the steps of providing in a separation chamber, a gas-permeable, pore-free membrane consisting of the polymer perfluoro-2,2-dimethyl-1,3-dioxol as a separation member between two spaces of said separation chamber and supplying a supercritical gas including said component to one side of said membrane for transfer of said supercritical gas through said membrane, thereby separating said gas as permeate from said component while retaining said component as retentate.

2. A method according to claim 1, wherein said polymer is a homopolymer comprising perfluoro-2,2-dlmethyl-1,3-dioxol.

3. A method according to claim 1, wherein said polymer is a copolymer comprising perfluoro-2,2-dimethyl-1,3-dioxol and tetrafluoroethylene.

4. A method according to claim 3, wherein said copolymer contains 65–99 mol % perfluoro-2,2-dimethyl-1,3-dioxol.

5. A method according to claim 1, wherein said gas is supercritical carbon dioxide.

6. A method according to claim 1, wherein said membrane is a composite membrane including a selective separation layer of perfluoro-2,2-dimethyl-1,3-dioxol and tetrafluoroethylene.

7. A method according to claim 6, wherein the selective separation layer has a thickness of 0.2 to 20 $\mu$m.

8. A method according to claim 6, wherein said selective separation layer is disposed on a carrier membrane consisting of polyether imide.

9. A method according to claim 6, wherein said selective separation layer is disposed on a carrier membrane of porous polyvinylidene fluoride.

10. A method according to claim 6, wherein said selective separation layer is disposed on a carrier membrane of porous polyether sulfone.

11. A method according to claim 6, wherein said selective separation layer is disposed on a carrier membrane of porous polyacryl nitrile.

12. A method according to claim 6, wherein said selective separation layer is disposed on a carrier membrane of a porous organic ceramic material.

* * * * *